United States Patent [19]
Barry

[11] Patent Number: 5,632,212
[45] Date of Patent: May 27, 1997

[54] DUAL-SPEED CLUTCH FOR AGRICULTURAL PLANTER

[75] Inventor: Alan F. Barry, Fairfax, Iowa

[73] Assignee: Kinze Manufacturing, Inc., Williamsburg, Iowa

[21] Appl. No.: 375,788

[22] Filed: Jan. 20, 1995

[51] Int. Cl.⁶ .................................................. A01C 7/20
[52] U.S. Cl. ........................ 111/200; 111/178; 111/900
[58] Field of Search .......................... 111/8, 52, 104, 111/170, 178, 133, 900, 922; 192/33 C, 35, 41 R, 41 S, 48.1, 48.2, 48.92, 50; 221/185, 211; 222/368, 486, 609, 610

[56] References Cited

U.S. PATENT DOCUMENTS

| | | | |
|---|---|---|---|
| 4,122,974 | 10/1978 | Harbert et al. | 111/904 X |
| 5,003,894 | 4/1991 | Lafferty | 111/178 |
| 5,024,173 | 6/1991 | Deckler | 111/178 |
| 5,025,951 | 6/1991 | Hook et al. | 111/904 X |
| 5,078,066 | 1/1992 | Lafferty | 111/178 |

*Primary Examiner*—Terry Lee Melius
*Assistant Examiner*—Robert Pezzuto
*Attorney, Agent, or Firm*—Emrich & Dithmar

[57] ABSTRACT

A mechanical clutch for use in metering seeds in an agricultural planter unit allows for selecting the input drive from either a primary drive source operating at a first RPM or a secondary drive source operating at a second, reduced RPM for dispensing seed at two different speeds. A third mode of operation of the clutch may also be selected wherein the seed metering mechanism is disconnected from the two drive sources. This arrangement allows a ground driven implement such as a planter to either (1) plant at a first predetermined population per acre; (2) plant at a second, lower population per acre; or (3) not plant at all. The clutch is driven by a ground engaging wheel and drive wheel combination, with the two seed dispensing speeds as well as the planter by-pass mode on-the-go selectable by an operator via a suitable electrical switch and solenoid combination.

18 Claims, 6 Drawing Sheets

DUAL-SPEED CLUTCH FOR AGRICULTURAL PLANTER

FIELD OF THE INVENTION

This invention relates generally to agricultural planters and is particularly directed to a dual-speed mechanical clutch for an agricultural planter which permits the metering of seeds during planting at two different seed dispensing rates which are selectable by an operator.

BACKGROUND OF THE INVENTION

Large scale agricultural planters typically employ a number of row crop planter units attached in a side-by-side, spaced manner to a support frame which is drawn by a tractor. Each of the row units has a seed meter employing either discs or plates rotating in a vertical plane for grasping and discharging the seeds at a given discharge rate. The discharge rate may be changed depending upon the type of crop, the soil condition and type, and the characteristics of the terrain. For example, in the corners of a field having a center circular irrigation system it is desirable to reduce the planting population rate in accordance with the reduced capability of the drier soil to support the crop. In this and similar situations, it is desirable to be able to easily and quickly change from one planting population rate to another while the implement traverses the field.

One prior art approach to changing the planting population rate involves changing sprocket and gear combinations attached to various shafts. This approach requires the implement to be stopped for as long as ten minutes while one or more chains or belts are moved and positioned about various sized sprockets or gears. This approach not only takes the implement out of operation for a considerable time, but also requires additional work by the operator. Some more recent approaches such as disclosed in U.S. Pat. No. 4,623,078 afford the capability to adjust the planting population rate while continuously planting. While the '078 patent discloses a two-speed planter drive unit, it does not afford complete disengagement of the planter unit from the drive unit which is frequently desirable under certain circumstances. For example, depending on the soil conditions including the moisture content, it may be desirable to continue planting with some of the planter units such as on one side of the tractor centerline, while discontinuing planting with those planter units to the other side of the tractor centerline. This capability is not available in the '078 patent and requires removing the implement from service which is costly, time consuming and inconvenient.

The present invention addresses the aforementioned limitations of the prior art by affording on-the-go control in a dual-speed clutch arrangement for selecting a higher or lower planting population rate in a planter implement having a plurality of spaced row units and further offers the advantage of quickly and easily disconnecting some or all of the individual row units from the input drive.

OBJECTS AND SUMMARY OF THE INVENTION

This invention contemplates a dual speed clutch for an agricultural planter for metering the discharge of seeds at two different rates and also allows for the complete disconnection of the planter unit from the input drive to terminate seed discharge. The dual-speed clutch is electrically controlled and allows for selection of the input drive from either a primary drive source operating at a first RPM or a secondary drive source operating at a second, reduced RPM for dispensing seeds at two different populations.

The dual-speed clutch includes three hubs, two drive springs and two release sleeves. The three hubs include input and output hubs as well as an intermediate hub assembly disposed between and coupled to the input and output hubs. The springs are torsion springs disposed about the various hubs, while the release sleeves are disposed about and coupled to the various hubs. A release sleeve is disposed about and coupled to the output hub and the portion of the intermediate hub assembly adjacent to the output hub assembly. Another release sleeve is disposed about and coupled to the input hub and the portion of the intermediate hub adjacent to the input hub. The two release sleeves are each adapted for engagement by a respective solenoid-actuated stop lever for controlling rotation of the sleeves as well as the hubs coupled thereto. The ratio of an input sprocket coupled to the input hub to a first sprocket connected to a planter drive wheel is greater than the ratio of an over-running clutch sprocket coupled to the intermediate hub assembly to a second sprocket connected to the planter drive wheel. The relative sizes of the two sprockets in each of these sprocket pairs permits the first input sprocket to rotate at a higher speed than the over-running clutch sprocket. Input drive power is derived by the rotation of the planter drive wheel and is transferred at a first, higher RPM via the combination of the first sprocket coupled to the planter drive wheel and the input sprocket to the clutch's input hub. Power is transferred to the output hub by means of the aforementioned first and second drive springs and the intermediate hub assembly. An inner hub of the over-running clutch attached to the over-running clutch's sprocket turns at a rate equal to that of the input sprocket in the first, high RPM mode of operation because the input and output hubs are coupled together. Stopping the rotation of the second release sleeve of the dual-speed clutch disconnects the input sprocket from the intermediate hub assembly resulting in power being transferred from the planter drive wheel via the over-running clutch and intermediate hub portion of the dual-speed clutch arrangement to the output hub and the output sprocket for driving the seed discharge units of the row units at a second, reduced RPM. Stopping rotation of the first release sleeve disconnects the intermediate hub assembly from the output hub of the dual-speed clutch resulting in no rotational power being transferred to the output sprocket and terminates the discharge of seeds from the seed discharge units.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF A PREFERRED EMBODIMENT

Figure 1:
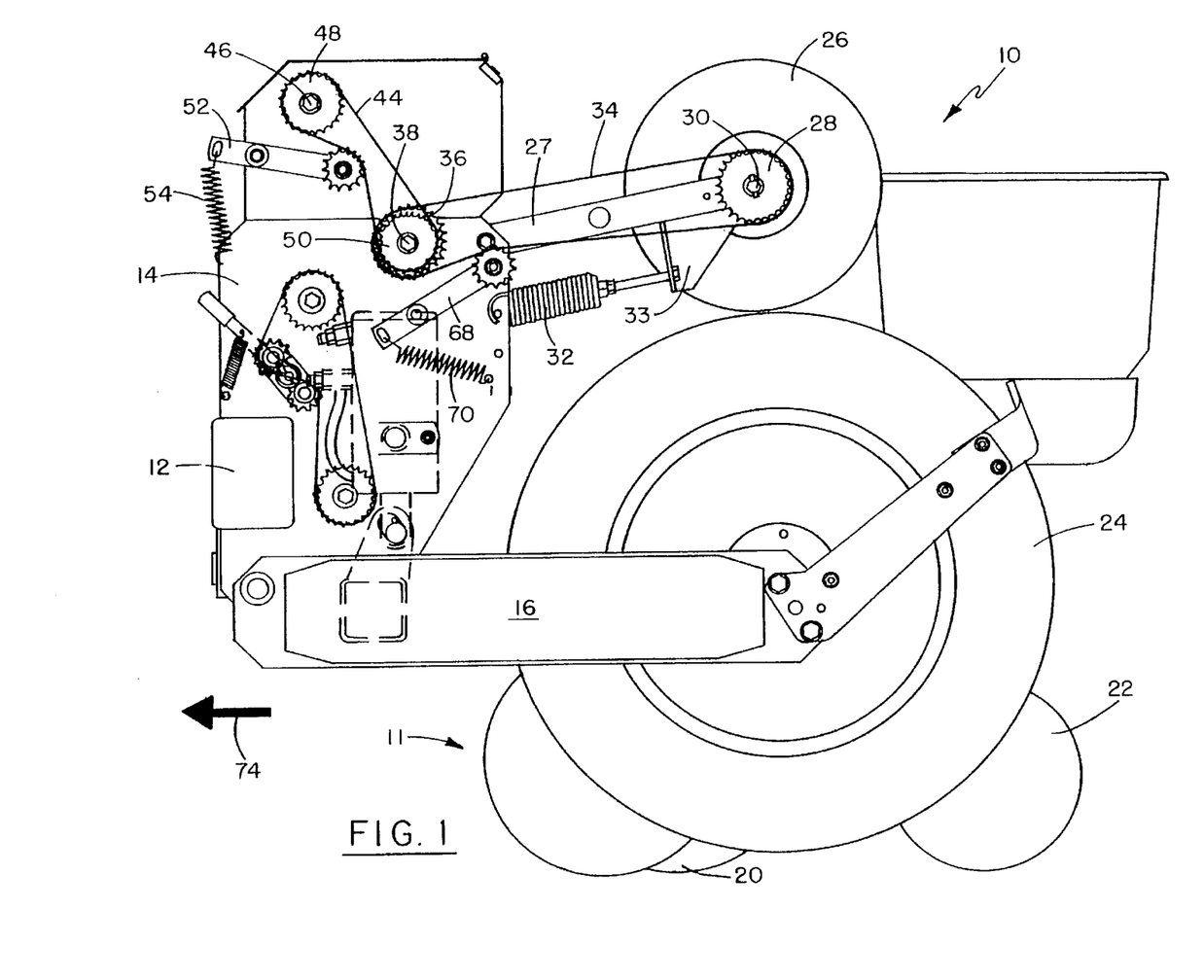
FIG. 1 is a first side elevation view of a row crop planter unit incorporating a dual-speed clutch in accordance with the present invention.
Figure 2:
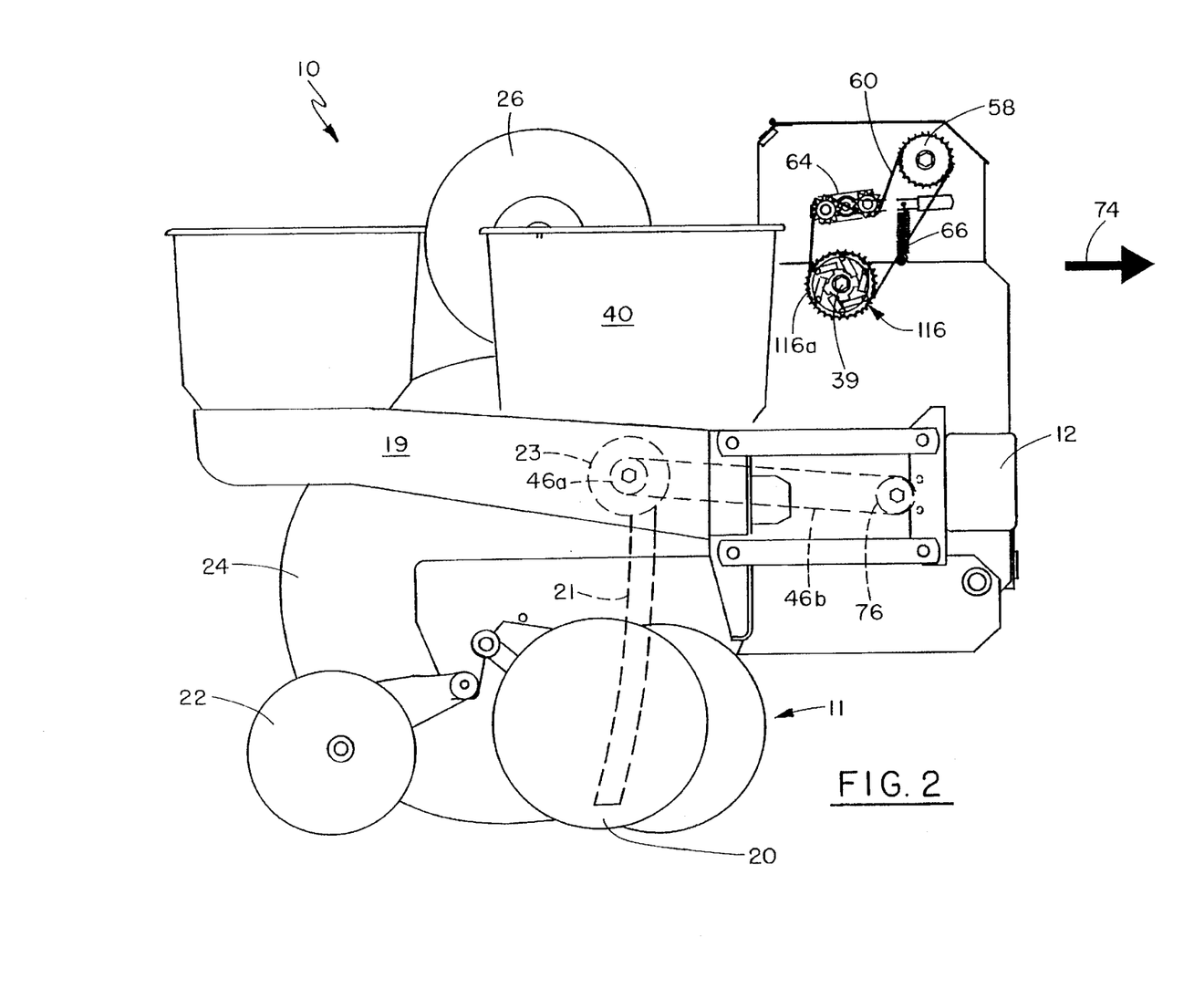
FIG. 2 is an opposed side elevation view of the planter unit shown in FIG. 1.
Figure 3:
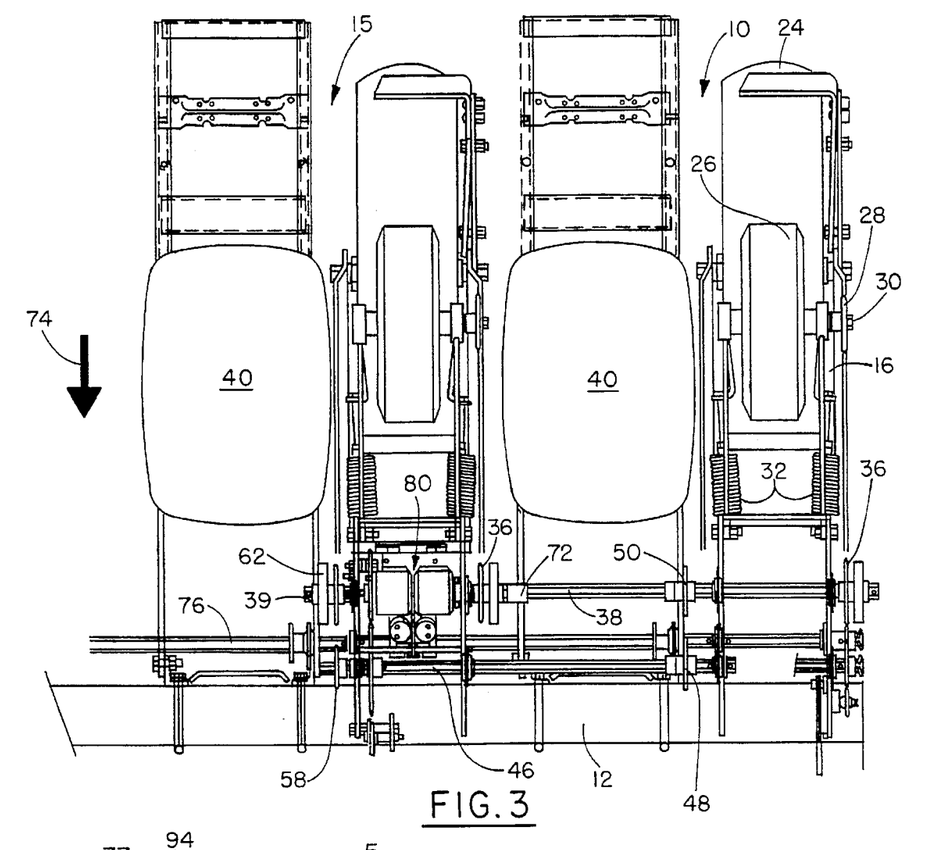
FIG. 3 is a plan view of a pair of side-by-side row crop planter units each, driven by the dual-speed clutch of the present invention.
Figure 4:
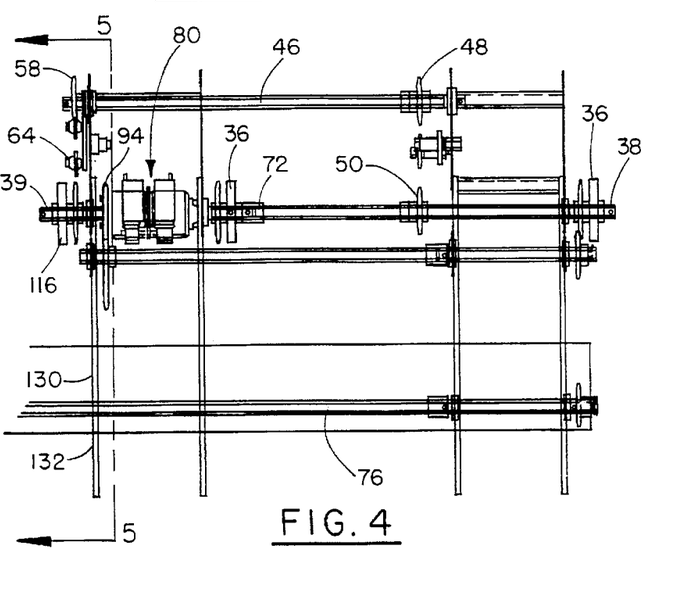
FIG. 4 is a front elevation view of a portion of the drive mechanism for the dual-speed clutch shown in the plan view of FIG. 3.
Figure 5:
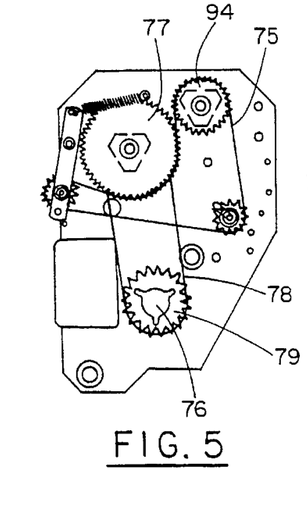
FIG. 5 is a sectional view of the portion of the drive mechanism of the dual-speed clutch shown in FIG. 4 taken along site line 5—5 therein.

Referring to FIGS. 1 and 2, there are shown respective, opposed side elevation views of a planter row unit and drive mechanism 10 incorporating a dual-speed clutch in accordance with the present invention. FIG. 3 is a plan view of a pair of side-by-side planter row units and drive mechanisms 10 and 15 showing the dual-speed clutch 80 of the present invention in the row unit drive arrangement. FIG. 4 is a front elevation view of the planter drive arrangement of FIG. 3 also showing the location of the dual-speed clutch assembly 80 of the present invention therein. FIG. 5 is a sectional view of the planter drive arrangement shown in FIG. 4 taken along site line 5—5 therein.

Planter row unit and drive mechanism 10 includes a frame 14 mounted to an elongated tool bar 12 which is drawn by a tractor (not shown for simplicity). Attached to frame 14 is a first support arm 16, also attached to tool bar 12 is a planter row and unit frame 19. Mounted to a lower portion of frame 19 is a disc furrow opener including a pair of discs 11 for opening a seed furrow as the planter row unit is pulled forward or in the direction of arrow 74 in the figures. A pair of gauge wheels 22 (only one of which is shown) cooperate with the leading pair of furrow opening discs to form the furrow as seed are selected and discharged from a seed tube 21 (shown in dotted line form in FIG. 2) extending downwardly from a forward seed hopper 40 mounted to the planter row unit frame 19. Aft of the gauge wheels 20 is a pair of angled closing wheels 22 (only one of which is shown in the figures for simplicity) for closing the furrow after the seed is deposited. Coupling the seed tube 21 to the seed hopper 40 is a seed meter or discharge unit 23 (also shown in dotted line form) which is coupled to and driven by a shaft 46a, chain 46b, shaft 76, which, in turn, is rotationally displaced by the dual-speed clutch of the present invention as described below.

Also mounted to frame 14 by means of support arm 16 is a ground engaging wheel 24. Wheel 24 rotates as the planter row unit and drive mechanism 10 is displaced over the ground. Disposed above and in contact with wheel 24 is a planter drive wheel 26. Planter drive wheel 26 is rotationally coupled to and supported by a shaft 30 which, in turn, is coupled to and supported by an arm 27. The other end of support arm 27 is pivotally coupled to frame 14. Planter drive wheel 26 rotates in response to the rotation of the ground engaging wheel 24 for driving the dual-speed clutch of the present invention as described in detail below.

Forward travel of the planter row unit and drive mechanism 10 in the direction of arrow 74 rotates the ground engaging wheel 24 causing rotation of the planter drive wheel 26. Secure contact between the ground engaging wheel 24 and the planter drive wheel 26 is provided by means of down pressure springs 32 (only one of which is shown in the figures) which is connected between frame 14 and a bracket 33 attached to the sprocket support arm 27. Rotational displacement of planter drive wheel 26 causes a corresponding rotational displacement of sprocket 28 through shaft 30. Rotation of sprocket 28 is transferred via a chain 34 to sprocket 36 which is mounted on and supported by shaft 38. Chain 34 is maintained under tension by the combination of an idler assembly 68 and a spring 70. A second sprocket 50 is also attached to and supported by shaft 38 and also rotates with the rotation of sprocket 36. In the case of multiple ground engaging and planter drive wheel combinations, lengths of shaft 38 may be connected together by means of one or more sleeves 72 as shown in FIGS. 3 and 4. In addition, while multiple ground engaging and planter drive wheel combinations are shown, the dual-speed clutch of the present invention may equally as well be driven by a single ground engaging and planter drive wheel combination. Finally, the dual-speed clutch arrangement of the present invention is not limited to being driven by a ground engaging and planter drive wheel combination, but may be driven by virtually any type of rotational displacement take-off arrangement including a drive chain directly coupled to a ground engaging wheel, or by means of a hydraulic or electric drive arrangement.

Figures 6, 7:
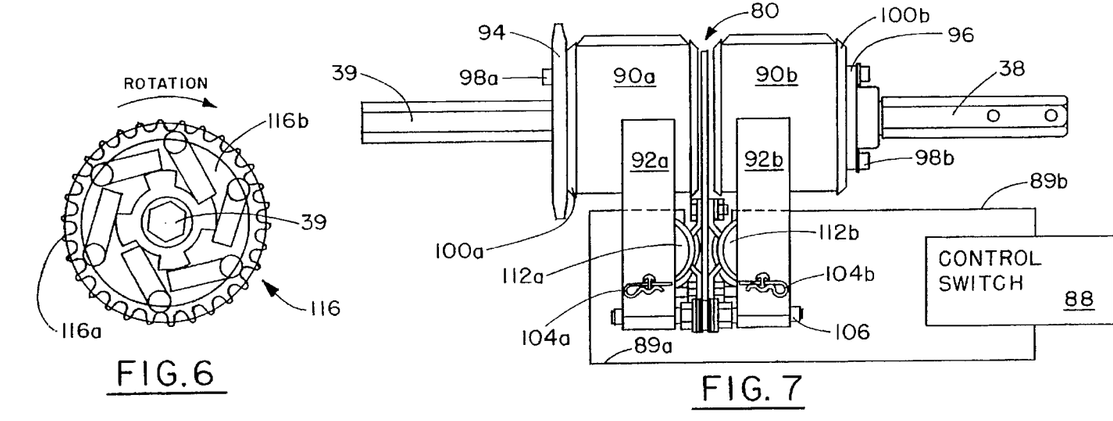
FIG. 6 is an elevation view of an over-running clutch employed in the dual-speed clutch of the present invention.
FIG. 7 is a combined simplified block diagram and elevation view of the dual-speed clutch of the present invention.
Figure 8:
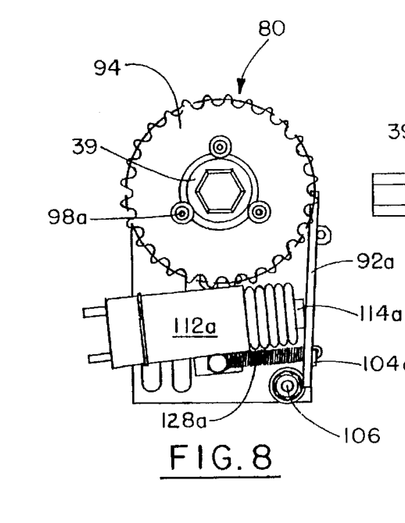
FIG. 8 is an elevation view of a first side of the dual-speed clutch of FIG. 7.
Figure 9:
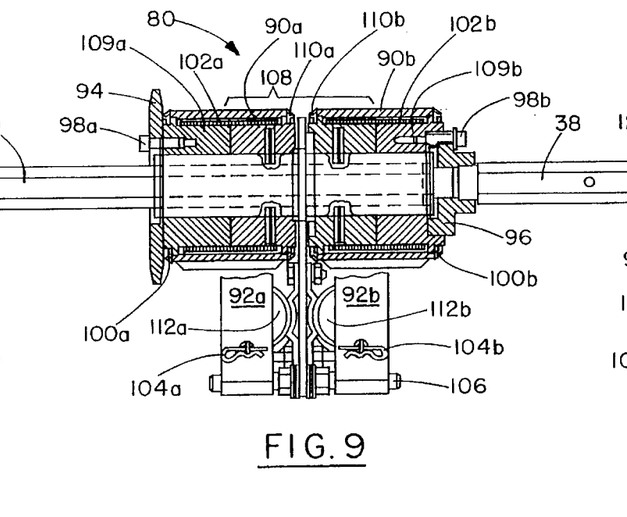
FIG. 9 is a view shown partially in section and partially cutaway of the inventive dual-speed clutch.

Sprocket 50 thus rotates in unison with sprocket 36 and is, in turn, coupled to sprocket 48 by means of a chain 44. Chain 44 is maintained under tension by means of the combination of an idler assembly 52 and a spring 54. Sprocket 48 is mounted to and rotationally drives shaft 46. Shaft 46 is also coupled to and supports sprocket 58 as shown in FIGS. 3 and 4. Sprocket 58 is, in turn, coupled by means of chain 60 to an over-running clutch assembly 116. Over-running clutch 116 is mounted to and supported by a secondary input shaft 39 from the dual-speed clutch 80 of the present invention, while aforementioned shaft 38 is the primary input shaft to the dual-speed clutch assembly as shown in FIGS. 3 and 4. In this arrangement, it is essential that the RPM of the over-running clutch 116 be less than the RPM of the primary input shaft 38 of the dual-speed clutch assembly 80. This may be accomplished by providing sprockets 50 and 48 with the same number of teeth and providing sprocket 58 with fewer teeth than the sprocket 116a in the over-running clutch 116 which is shown in greater detail in the elevation view of FIG. 6. Tension in chain 60 is maintained by means of the combination of an idler assembly 64 and a spring 66.

Thus far has been described the manner in which the input shaft 38 of the dual-speed clutch assembly 80 of the present invention is driven by the combination of ground engaging wheel 24 and planter drive wheel 26 via various combinations of sprockets and chains. The manner in which the output shaft 39 of the dual-speed clutch assembly 80 is also driven by the ground engaging wheel 24 and planter drive wheel 26 combination via various sprockets and chains in by-passing the dual-speed clutch assembly has also been described. The operation and configuration of the dual-speed clutch assembly 80 itself which is shown in various views in FIGS. 7-10 will now be described.

The dual-speed clutch assembly 80 includes the aforementioned primary input shaft 38 and the secondary input shaft 39. Coupled to the input shaft 38 is the combination of an adapter 96, a first control sleeve 90b, an input hub 109b and an outer seal 100b. A plurality of mounting bolts 98b securely couple the adapter 96 to the input hub 109b.

Similarly, the secondary input shaft is coupled to the intermediate hub assembly 108. Output sprocket 94 is coupled to output hub 109a by a plurality of mounting bolts 98a. Seal 100a is coupled to the output hub 109a. An intermediate hub assembly 108 is disposed within and extends between the first and second control sleeves 90a, 90b and is positioned intermediate the output and input hubs 109a, 109b. Disposed within the first control sleeve 90a is a cylindrical secondary drive spring 102a. Secondary drive spring 102a couples the intermediate hub assembly 108 to the output hub 109a. Similarly, disposed within the second control sleeve 90b is a cylindrical primary drive spring 102b. The primary drive spring 102b couples the input hub 109b to the intermediate hub assembly 108. Secondary drive spring 102a is disposed about output hub 109a and a portion of the intermediate hub assembly 108 and within the first control sleeve 90a.

Similarly, primary drive spring 102b is disposed about input hub 109b and a portion of the intermediate hub assembly 108 and within the second control sleeve 90b. The manner in which the intermediate hub assembly 108 is coupled to the output and input hubs 109a, 109b is shown in the sectional view of FIG. 12 of the combination of the first control sleeve 90a and the secondary drive spring 102a. As shown in the figure, disposed about the inner portion of the first control sleeve 90a in an equally spaced manner are a plurality of spaced slots or grooves 126a, 126b and 126c. Disposed in an equally spaced manner about the outer periphery of the first control sleeve 90a are a plurality of stop tangs 122a, 122b and 122c. Disposed on the end of the secondary drive spring 102a is a control tang 124. Control tang 124 is disposed within inner slot 126b of the first control sleeve 90a for securely coupling the drive spring to the control sleeve. It is in this manner that the output and input hubs 109a, 109b are coupled to and rotate with the intermediate hub assembly 108 in one mode of operation as described in detail below.

Remote operator control of the dual-speed clutch assembly 80 is accomplished by means of an operator actuated control switch 88 coupled to first and second solenoids 112a and 112b. Actuation of a solenoid by means of an appropriate electrical signal provided from control switch 88 retracts its plunger assembly for controlling rotation of the first and second control sleeves 90a, 90b in directing input drive power through the dual-speed clutch 80 in the following manner. During normal operation, or when operating at a higher seed planting rate, the primary input shaft 38, adapter 96, primary input hub 109b, intermediate hub assembly 108, output hub 109a, the first and second drive springs 102a and 102b, the first and second control sleeves 90a and 90b, and the secondary input shaft 39 all rotate in unison at the same RPM. In this mode of operation, the secondary input shaft 39 rotates at the same speed as the primary input shaft 38.

Disposed on the secondary input shaft 39 is the aforementioned over-running clutch 116 as shown in FIGS. 2, 3, 4 and 11, which is a simplified top plan view of the dual-speed clutch 80 and planter drive wheel 26 combination together with associated sprockets and shafts which are described below. Over-running clutch 116 includes the aforementioned outer sprocket 116a and an inner hub portion 116b coupled to the secondary input shaft 39. During normal, high speed operation, all of the aforementioned components of the dual-speed clutch 80 are coupled together permitting the input and secondary input shafts 38, 39 to rotate at the same RPM. In this situation, the inner hub portion 116b of the over-running clutch 116 rotates at a higher RPM than its outer sprocket portion 116a and no power is transmitted from the sprocket portion of the over-running clutch. The sprocket portion 116a of the over-running clutch is coupled by means of a chain 118 to a sprocket 120 disposed on the same shaft 30 as is sprocket 28, with the shaft extending through and rotating with the planter drive wheel 26. In this mode of operation, input drive power is provided from the planter drive wheel 26 to sprocket 36 and then via the input shaft 38 and the right and left portions of the dual-speed clutch assembly 80 to the output sprocket 94. Output sprocket 94 is, in turn, coupled via a pair of chains 75 and 78 and a sprocket 77 combination to the combination of a sprocket 79 and the planter drive shaft 76 for rotationally displacing the planter drive shaft and driving the row unit's seed discharge unit 23 as shown in FIGS. 4 and 5.

Figure 13:
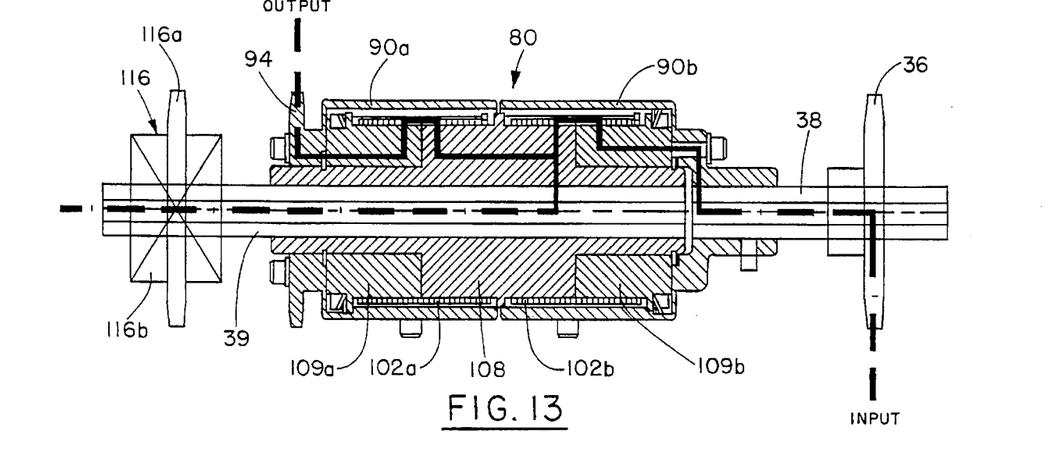
FIGS. 13 and 14 are sectional views of the inventive dual-speed clutch respectively illustrating the primary drive path and the secondary drive path through the clutch in providing the dual-speed capability.

The input drive flow in this mode of operation is shown in the sectional view of the dual-speed clutch assembly 80 of FIG. 13 wherein input power is provided from sprocket 36 via the primary input shaft 38 and dual-speed clutch assembly 80 to the output sprocket 94 for driving the row units. In this mode of operation, the over-running clutch 116 is not involved with the transmission of power in driving the row units and the secondary input shaft 39 operates at the same RPM as the primary input shaft 38.

Figure 10:
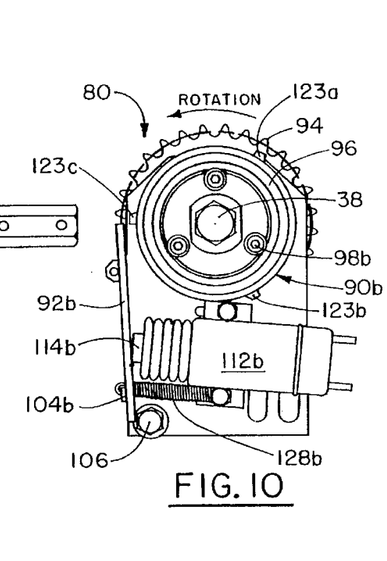
FIG. 10 is an elevation view of the dual-speed clutch shown in FIG. 7 illustrating the side of the clutch opposite that shown in FIG. 8.

As briefly described above and as shown in FIG. 7, operator control of the dual-speed clutch 80 is provided via a control switch 88 connected to the first and second solenoids 112a, 112b. The first and second solenoids 112a, 112b control the rotation of the output and input hubs 109a, 109b in the following manner. Each of the solenoids 112a, 112b is conventional in design and operation and includes a respective boot, spring and plunger. Thus, the first solenoid 112a includes a first plunger 114a, while the second solenoid 112b includes a second plunger 114b. Energizing the solenoid retracts its plunger. Each of the first and second stop levers 92a and 92b is coupled to and urged toward its associated solenoid by means of a respective tension spring 128a and 128b. Thus, retraction of plunger 114a of the first solenoid 112a allows for counterclockwise rotation of a first stop lever 92a as viewed in FIG. 8. Stop lever 92a is preferably comprised of a rigid, relatively high strength material such as metal or plastic and is pivotally mounted to the dual-speed clutch assembly 80 by means of a pivot shaft 106. Stop lever 92a is urged to the retracted position, or in a counterclockwise direction as viewed in FIG. 8, by means of the first tension spring 128a. Tension spring 128a is inserted through an aperture within the first stop lever 92a and is coupled thereto by means of a retaining pin 104a. As shown in FIG. 10, the second solenoid 112b includes a plunger 114b which engages a second stop lever 92b. The second stop lever 92b is coupled to the dual-speed clutch assembly 80 by means of the aforementioned pivot shaft 106 and is urged in a clockwise direction as viewed in FIG. 10 about the pivot pin by means of a second tension spring 128b coupled to the stop lever by means of a retaining pin 104b.

Figure 12:
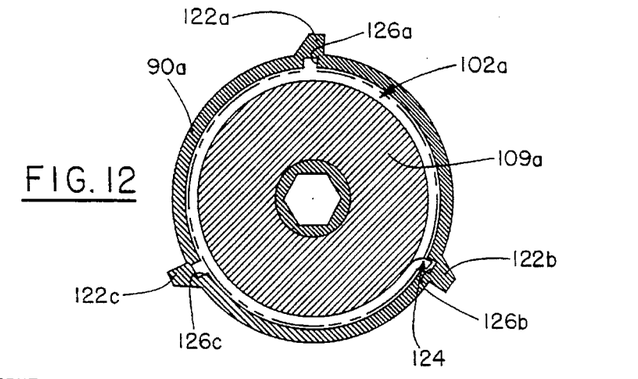
FIG. 12 is a sectional view showing the coupling between a drive spring and a control sleeve in the inventive dual-speed clutch.

As shown in FIG. 10, disposed about the outer periphery of the second control sleeve 90b are a plurality of spaced stop tangs 123a, 123b and 123c similar to stop tangs 122a, 122b and 122c on the first control sleeve 90a as shown in FIG. 12 and described above. When the plunger of a solenoid is retracted, its associated stop lever which it is in contact with is urged into secure engagement with a stop tang of an associated control sleeve. Thus, when plunger 114a of solenoid 112a is retracted, stop lever 92a assumes the position shown in FIG. 8 for engaging a stop tang of the first control sleeve 98 and preventing its rotation. Similarly, retraction of plunger 114b of solenoid 112b causes stop lever 92b to engage a stop tang of the second control sleeve 90b and prevent its further rotation. When the rotation of the control sleeve is stopped, the rotation of its associated main drive spring also stops. Thus, when the rotation of the first control sleeve 90a is stopped, rotation of the secondary drive spring 102a also stops. Similarly, stopping the rotation of the second control sleeve 90b stops rotational displacement of the primary drive spring 102b.

During the normal engaged mode of operation, frictional contact is maintained between the driving hub and the drive spring. Likewise, frictional contact is maintained between the drive spring and the driven hub. Rotation of the driven hub urges the spring inside diameter to shrink, thus increasing the frictional contact between the hub and the spring and causing power to be transferred from the drive hub to the spring and to the driven hub.

Stopping the rotation of the release sleeve urges the spring inside diameter to increase and, therefore, break the frictional contact between the drive hub and the spring, thereby stopping the transfer of rotational power.

Figures 11, 11A:
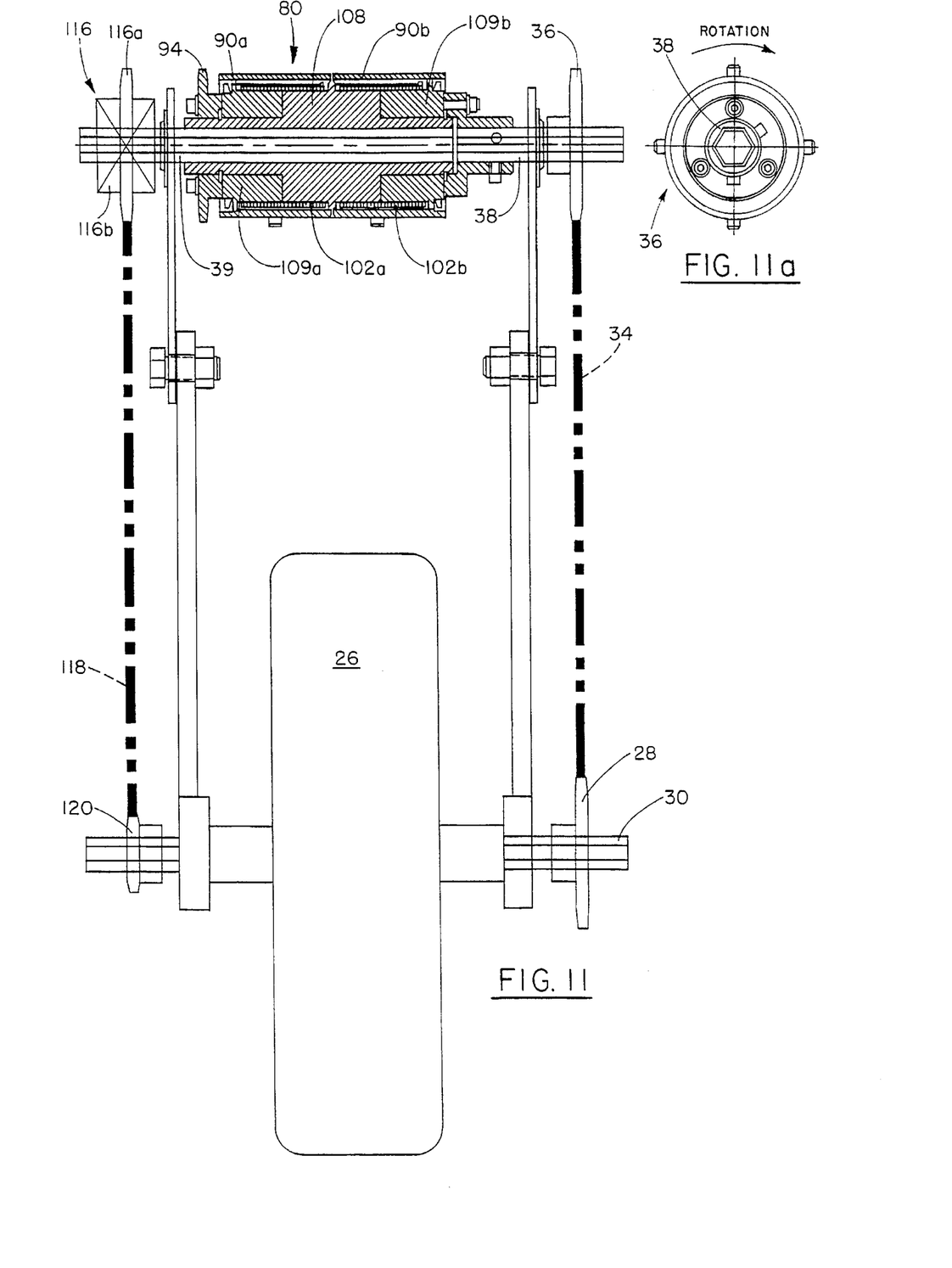
FIG. 11 is a schematic diagram shown partially in section of the simplified drive arrangement for the dual-speed clutch.
FIG. 11a is a side elevation view of the input sprocket and shaft combination showing the direction of rotation.
Figure 14:
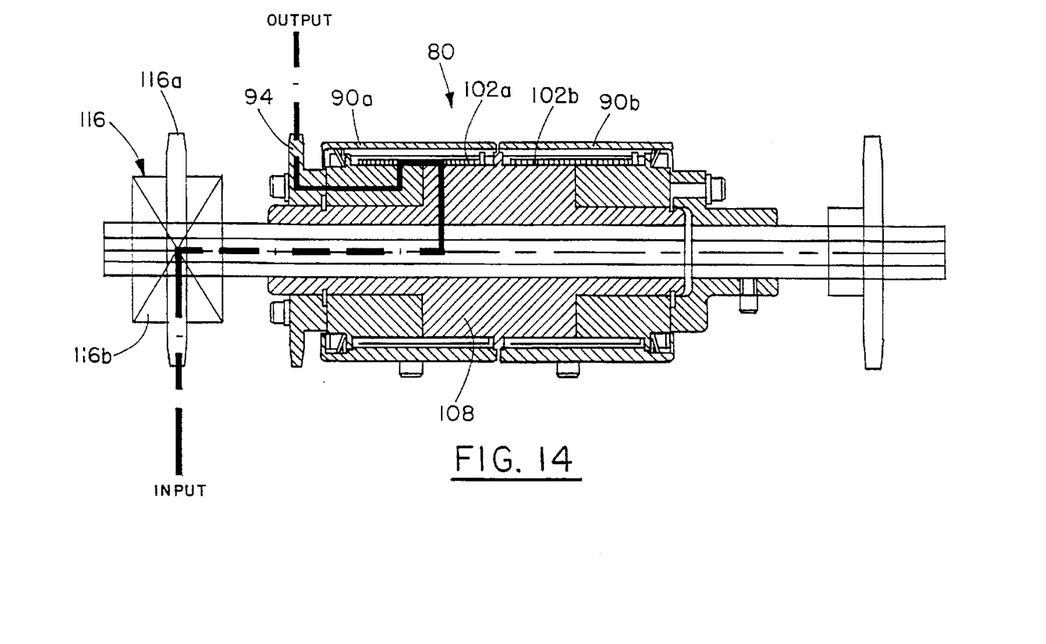

Stopping the rotation of the primary drive spring 102b causes the primary drive spring to stop rotationally driving the intermediate hub assembly 108 from the primary input shaft 38 and input hub 109b. With the intermediate hub assembly 108 and the output shaft 39 no longer rotating, the over-running clutch 116 engages and begins to drive the intermediate hub assembly at its operating RPM which is lower than the RPM of the input shaft 38. In this second mode of operation, the drive input is provided via sprocket 120 and chain 118 to the over-running clutch assembly 116 and thence to the output sprocket 94 via the left-hand portion of the dual-speed clutch assembly 80 as shown in FIG. 11 and in the sectional view of FIG. 14. Deactivating the second solenoid 112b resulting in extension of its plunger 114b allows the second Control sleeve 90b to begin rotating resulting in re-engagement of the primary drive spring 102b, with the output speed returning to the speed of rotation of the input shaft 38.

Activating the first solenoid 112a stops rotation of control sleeve 90a and the secondary drive spring 102a. This disconnects the intermediate hub assembly 108 from the output hub 109a resulting in the stopping of rotation of the output sprocket 94 while allowing for continued rotation of the secondary input shaft 39 at either the RPM of the input shaft 38 if the second solenoid 112b is not energized, or at the RPM of the over-running clutch 116 if the second solenoid 112b is energized.

There has thus been shown a dual-speed clutch for an agricultural planter for use in metering seeds at either a first higher speed or a second, lower speed. In discharging seeds at the higher speed, a primary drive source operating at a first higher RPM drives the seed discharge unit, while at the lower speed of operation a secondary drive source operating at a second, reduced RPM drives the seed discharge unit of each row unit. In both cases, the input drive is derived from the combination of a ground engaging wheel and a planter drive wheel. A third mode of operation of the clutch may also be selected wherein the seed metering mechanism is disconnected from the two drive source and seed discharge is terminated. Control of the dual-speed clutch assembly is provided by means of an electronic switch coupled to a pair of solenoids allowing an operator to control the path of the drive input to the seed metering mechanism. This arrangement allows a ground driven implement such as a planter to discharge seeds at either a first, higher or a second, lower population per acre, or to disengage the drive input from the seed metering mechanism in terminating seed discharge. The aforementioned switch and solenoid combination permits an operator to select among the three modes of operation while the agricultural planter unit is being pulled by a tractor to provide an on-the-go selection capability.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. For use in an agricultural planter having a plurality of row units each having a seed meter, apparatus for changing a rate at which the meters are driven, said apparatus comprising:

a drive source;

an output drive coupled to the meters;

first drive means for selectively coupling said drive source to said output drive for driving the meters at a first, higher speed;

second drive means for selectively coupling said drive source to said output drive for driving said meters at a second, lower speed;

disconnect means for selectively uncoupling said first and second drive means from said output drive; and control means coupled to said first and second drives and to said disconnect means and responsive to an operator input for selectively (1) uncoupling said second drive means from said output drive for driving the seed meters at said first speed, (2) uncoupling said first drive means from said output drive for driving the seed meters at said second speed, or (3) actuating said disconnect means for uncoupling said first and second drive means from said output drive and preventing discharge of the seeds by the seed meters.

2. The apparatus of claim 1 wherein said drive source includes a ground engaging wheel.

3. The apparatus of claim 2 wherein said drive source further includes a sprocket and chain combination for coupling said ground engaging wheel to said first and second drive means.

4. The apparatus of claim 1 wherein said output drive includes a sprocket and chain combination for coupling said first and second drive means to the seed meters.

5. The apparatus of claim 1 wherein each of said first and second drive means includes a respective rotating outer control sleeve, a rotating inner hub and a drive spring coupling an outer control sleeve and an associated inner hub.

6. The apparatus of claim 5 wherein said first and second drive means each further includes a respective intermediate hub assembly coupling the inner hubs of said first and second drive means.

7. The apparatus of claim 6 wherein said disconnect means includes first and second stop levers for respectively engaging said outer control sleeves of each of said first and second drive means and preventing the rotation thereof for operating at said second speed when said first stop lever engages the outer control sleeve of said first drive means or for preventing discharge of the seeds when said first and second stop levers respectively engage the outer control sleeve of said first drive means and the outer control sleeve of said second drive means.

8. The apparatus of claim 7 wherein said disconnect means further includes first and second solenoids respectively coupled to said first and second stop levers for displacing said first and second stop levers into engagement with the outer control sleeve of a respective drive means.

9. The apparatus of claim 8 further comprising operator responsive switch means for actuating said first solenoid for operating at said second speed or for actuating said first and second solenoids for preventing discharge of the seeds.

10. The apparatus of claim 9 wherein said disconnect means further includes an over-running clutch coupled to said output drive for decoupling said first and second drive means from said output drive for preventing discharge of the seeds by the seed meters.

11. For use in an agricultural planter wherein an input shaft is coupled to a drive wheel for rotationally displacing said input shaft and wherein a rotating output shaft is coupled to a seed meter for discharging seeds from a hopper, a clutch mechanism comprising:

a rotating input assembly coupled to said input shaft and a rotating output assembly coupled to said output shaft;

an intermediate assembly coupling said input and output assemblies for rotating said output shaft at the same RPM as said input shaft and driving the seed meter at a first, higher speed;

first means coupled to said input assembly and to said output shaft for preventing rotation of said input assembly and for coupling said output shaft to the drive wheel for rotating said output shaft at a second, lower RPM and driving the seed meter at a second, lower speed; and second means coupled to said input and output assemblies for preventing rotation of said assemblies and terminating rotation of said output shaft and the discharge of seeds by the seed meter.

12. The clutch mechanism of claim 11 further comprising first and second outer control sleeves respectively coupled to and disposed about said output and input assemblies for rotating therewith, and wherein said first and second means each include a respective stop lever for engaging and preventing rotation of said first and second control sleeves, respectively.

13. The clutch mechanism of claim 12 wherein each of said first and second control sleeves includes a plurality of tangs disposed in a spaced manner about an outer surface thereof, and wherein said tangs are adapted for engagement by a respective stop lever for preventing rotation of said outer control sleeve.

14. The clutch mechanism of claim 13 further comprising first and second solenoids respectively coupled to said first and second stop levers for displacing said stop levers into secure engagement with the tangs of a respective outer control sleeve.

15. The clutch mechanism of claim 14 further comprising an operator control switch coupled to said first and second solenoids for actuating said first solenoid or said second solenoid for respectively operating at said first or said second seed discharge rate.

16. The clutch mechanism of claim 15 further comprising first and second drive springs each coupling a respective outer control sleeve to an associated assembly.

17. The clutch mechanism of claim 16 further comprising an over-running clutch for coupling said output assembly and said output shaft to said drive wheel when said first means prevents rotation of said input assembly for driving the seed meter at said second, lower speed.

18. The clutch mechanism of claim 17 wherein said over-running clutch includes an outer sprocket coupled to said drive wheel and an inner hub coupled to said output shaft, and wherein said output sprocket and said inner hub are free to rotate relative to one another.

* * * * *